United States Patent [19]

Kohlmüller et al.

[11] 3,926,675
[45] Dec. 16, 1975

[54] PROCESS FOR MAKING ELECTRODES CONTAINING RANEY NICKEL AND A THIOCYANATE

[75] Inventors: Hans Kohlmüller; Gerlind Kohlmüller, both of Erlangen, Germany

[73] Assignee: Siemens Aktiengesellschaft, Munich, Germany

[22] Filed: Sept. 17, 1973

[21] Appl. No.: 397,923

[30] Foreign Application Priority Data
Sept. 27, 1972 Germany.............................. 2247391

[52] U.S. Cl. .............................................. 136/86 E
[51] Int. Cl. ......................................... H01m 27/08
[58] Field of Search ............... 136/86 E, 86 R, 86 D

[56] References Cited
UNITED STATES PATENTS

| | | |
|---|---|---|
| 3,341,446 | 9/1967 | Vielstich ........................... 136/86 D |
| 3,442,711 | 5/1969 | Vielstich ........................... 136/86 R |
| 3,668,012 | 6/1972 | Jung et al. ........................ 136/86 D |

*Primary Examiner*—John H. Mack
*Assistant Examiner*—H. A. Feeley
*Attorney, Agent, or Firm*—Kenyon & Kenyon Reilly Carr & Chapin

[57] ABSTRACT

A new method is disclosed for preparing electrodes containing Raney nickel to be employed for the electrochemical conversion of hydrazine, in which a thiocyanate is introduced into the electrodes, advantageously by impregnating the electrodes with a thiocyanate solution. Electrodes prepared according to the invention generally contain a thiocyanate approximately in the range of between about 5 and about 25% by weight, based upon the amount of Raney nickel therein, and are useful as anodes in hydrazine/oxygen fuel cells.

9 Claims, 1 Drawing Figure

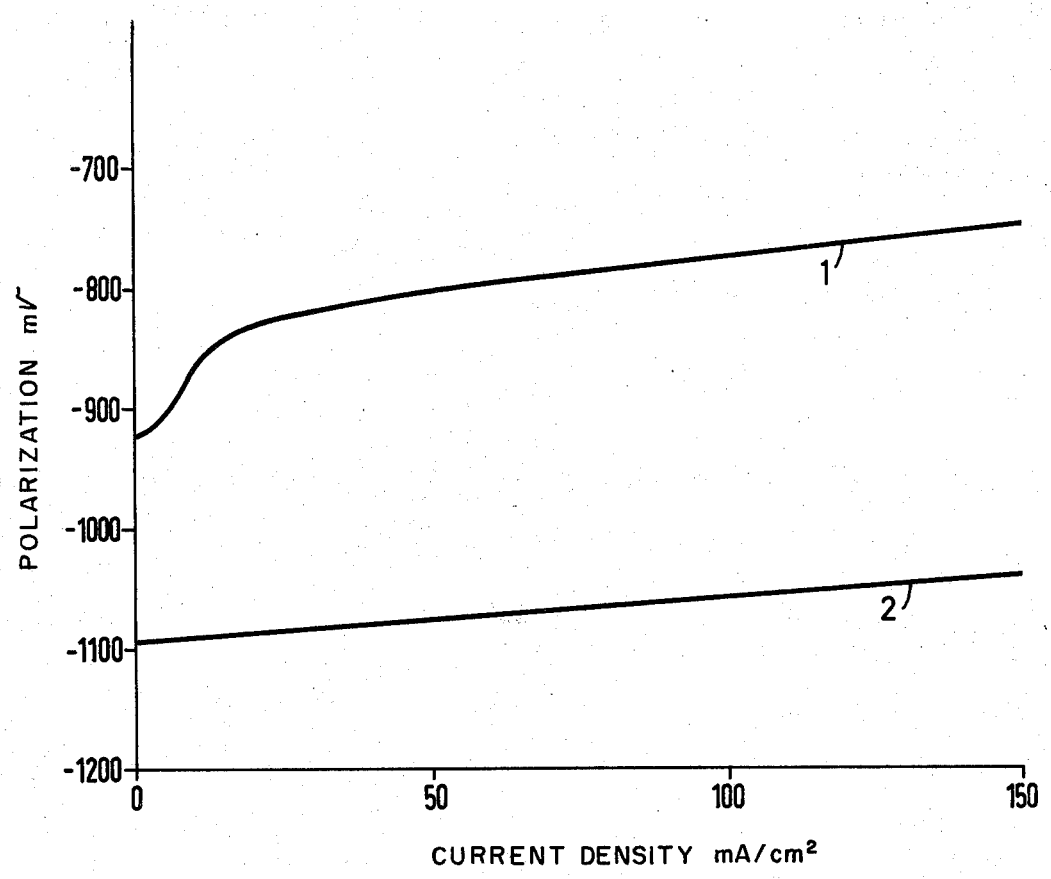

PROCESS FOR MAKING ELECTRODES CONTAINING RANEY NICKEL AND A THIOCYANATE

The invention relates to a method for preparing electrodes containing Raney nickel and which are useful for the electrochemical conversion of hydrazine.

In fuel cells and fuel cell batteries employing hydrazine as the fuel, the latter is largely dissolved in an alkaline electrolyte and is reacted electrochemically with an oxidant, e.g., air, oxygen or hydrogen peroxide. In a hydrazine/oxygen fuel cell, for instance, the following simplified reactions occur at the electrodes: In the anodic oxidation of the hydrazine, $$N_2H_4 + 4\ OH^- \rightarrow N_2 + 4\ H_2O + 4e^-;$$

and in the cathodic reduction of oxygen (in the alkaline electrolyte), $$O_2 + 2\ H_2O + 4e^- \rightarrow 4\ OH^-.$$

The equation for the overall energy producing process of the oxidation of hydrazine with oxygen is therefore:

$$N_2H_4 + O_2 \rightarrow N_2 + 2\ H_2O.$$

However, in addition to the foregoing anodic oxidation process which produces useful energy, a portion of the hydrazine dissolved in the electrolyte may also be dissociated in secondary reactions occurring at the fuel electrode (anode) without being utilized electrochemically. These secondary reactions include disproportionation of hydrazine into ammonia and nitrogen (for instance, $3\ N_2H_4 \rightarrow 4\ NH_3 + N_2$), and, in particular, the decomposition of hydrazine into nitrogen and hydrogen ($N_2H_4 \rightarrow N_2 + 2\ H_2$), without the hydrogen thus formed being involved to any appreciable extent in any energy-producing electrochemical reaction. Due to such secondary reactions, in which ammonia, hydrogen and nitrogen are formed, the Faraday efficiency of the cell is reduced. In addition, removal of the products formed by the undesired secondary reactions presents difficulties in cell design and operation.

To avoid unproductive decomposition of hydrazine, it is known to employ in fuel cells electrodes (anodes) which consist of an amalgamated, preferably sintered, lattice of nickel or cobalt, or of alloys of these metals with each other, where the electrode contains 0.3 to 20% by weight, and preferably 1 to 10% by weight, of mercury, as referred to in German Auslegescgrift No. 1,933,778. The corresponding Raney forms of nickel or cobalt can be used, among others, for the preparation of amalgamated electrodes. Their use is, however, uneconomical, as will be discussed further, and moreover, these highly active powders are difficult to fabricate into electrodes. A further disadvantage, finally, resides in the fact that such powders require considerably more mercury to achieve the intended effect through amalgamation.

Therefore, it is an object of the invention to furnish a process for generating electricity by means of a fuel cell employing hydrazine as a fuel which reduces the extent of occurrance of secondary reactions.

It is a further object to furnish a process for the preparation or treatment of electrodes, and the electrodes so prepared, containing Raney nickel which when employed for the electrochemical conversion of hydrazine minimize unproductive secondary reactions. The disadvantages and difficulties, which occur in the procedures heretofore known in the art are avoided or reduced in effect. The use of mercury is obviated, not least because of its toxicity. In addition, electrodes are obtained which show good performance characteristics in life tests in fuel cells employing hydrazine.

Broadly stated, the invention comprises electrodes of Raney nickel which have been impregnated with a thiocyanate, the processes of preparing such electrodes, and the use thereof to generate electricity in a fuel cell wherein the fuel comprises hydrazine. The thiocyanate is advantageously an alkali metal thiocyanate, especially potassium thiocyanate or sodium thiocyanate. The electrode may be made by immersing a Raney nickel electrode, previously fabricated in accordance with known methods, in a dilute aqueous solution of the thiocyanate. Advantageously the solution is alkaline and contains an alkali metal hydroxide such as potassium or sodium hydroxide. The amount of thiocyanate impregnated into the electrode is in the range of about 5 to about 25% by weight of the Raney nickel content of the electrode, advantageously in the range of about 15–20% by weight.

By introducing a thiocyanate into electrodes containing Raney nickel which serve for the electrochemical reaction of hydrazine, the rate at which the aforesaid secondary reactions take place is considerably reduced. While these secondary reactions are essentially completely suppressed with electrodes treated according to the invention and the Faraday efficiency, i.e., the electrochemical utilization of the hydrazine, of such electrodes is substantially increased, the main reaction, i.e., the energy-producing reaction of anodic oxidation of hydrazine, is essentially not affected.

It is important in the process of preparing the electrodes that the thiocyanate is specifically adsorbed by the electrode. Electrodes treated by the process according to the invention retain their ability to suppress such secondary reactions while immersed in an electrolytic liquid or an electrolyte/fuel mixture, i.e., during operation. The thiocyanate incorporated therein is therefore not dissolved from the electrodes during operation. Thus, there is little probability that in a fuel cell the corresponding oxygen electrodes (cathodes) may be adversely affected.

In the process according to the invention, the electrodes are advantageously impregnated with a thiocyanate solution. This may be accomplished by immersing the electrodes into a thiocyanate solution, preferably for an extended period of time. An aqueous solution of potassium or sodium thiocyanate in sodium or potassium hydroxide is preferably employed. Preferably, previously fabricated electrodes are employed for immersion into a thiocyanate solution. The use of a sodium or potassium hydroxide solution as the solvent for the thiocyanate, i.e., the use of a liquid which in operation serves as the electrolytic liquid, has the advantage that the effectiveness of the electrode cannot be impaired by the solvent for the thiocyanate. Other solvents may, of course, also be employed, particularly water, which does not impair the effectiveness of the electrodes.

It is advantageous to use a thiocyanate solution with a low thiocyanate content for impregnating the electrodes, i.e., a very dilute thiocyanate solution, in the range of about 0.0001 to about 0.01 molar, e.g., about 0.0015 molar, whereby the adsorption of the thiocyanate at the electrode takes place slowly, and particularly good results are obtained.

An electrode prepared according to the invention contains Raney nickel and a thiocyanate, the amount of the latter advantageously being in the range between about 5 and 25% by weight, based upon the Raney nickel. Particularly advantageous is a thiocyanate content about between 15 and 20% by weight, based upon the Raney nickel.

Electrodes so prepared exhibit excellent life test characteristics when hydrazine is being oxidized, and therefore surpass the amalgamated electrodes of the prior art, whose relatively poor characteristics in continuous operation are a noted disadvantage. It has, for instance, been found that the mercury inadequately adheres to the electrodes and therefore prematurely separates from the electrode surface.

The invention will be explained further with reference to examples of embodiments and FIG. 1, which figure depicts the current-voltage characteristics of two electrodes employed in fuel cells in which hydrazine is employed as the fuel.

Screen electrodes, in which Raney nickel is applied on a screen-like carrier of electrically conductive material, for instance, a nickel screen (see: D. H. Collins, "Power Sources 3", at pp. 373–390 of the Proceedings of the 7th International Power Sources Symposium, Brighton 1970, Oriel Press) are preferably employed as the anodes. A Raney alloy, which is subsequently activated, is applied to the carrier by means of a plasma spray (see: German Offenlegungsschrift No. 1,671,880). The plasma spray method offers the advantage of varying in a simple manner the amount of the catalytic coating applied.

Such an electrode having a coating of 20mg/cm$^2$ of Raney nickel on a nickel screen (wire thickness: 0.05 mm; mesh: 0.06 mm) and an electrode area of 12.5 cm$^2$ is immersed for about 50 hours in a solution of 45 mg of potassium thiocyanate in 300 ml of 6 $n$ KOH, i.e., an approximately 0.0015 molar thiocyanate solution. During such immersion, the thiocyanate is almost completely adsorbed by the electrode surface. The weight ratio of Raney nickel to thiocyanate in the electrode is therefore about 5.5:1; the thiocyanate content of the electrode is about 18% by weight, based upon the Raney nickel.

In FIG. 1, curve 10 represents the current-voltage characteristic of such an electrode employed as an anode to oxidize hydrazine. Curve 20 is the current-voltage characteristic of an untreated Raney nickel-containing electrode without a thiocyanate. The current density in mA/cm$^2$ is plotted on the abscissa and, on the ordinate, the polarization in mV, as measured against an Hg/HgO reference electrode. A 1-molar solution of hydrazine hydrate (N$_2$H$_5$OH) in 6 $n$ KOH at a temperature of 40°C served as the electrolyte. A comparison of curves 10 and 20 shows that the polarization is increased with an electrode treated according to the invention; at a current density of 50 mA/cm$^2$, for instance, the polarization is greater by about 275 mV.

However, the increase in the polarization is not a decisive criterion, because, more importantly, the thiocyanate content in the electrode causes a reduction of the above-described secondary reactions, and under the conditions above-state, causes the complete suppression of the secondary reactions.

The non-productive self-decomposition of hydrazine at an electrode can be determined by the amount and species of gas generated at the non-loaded electrode. The decomposition rate is generally referred to the electrode area and, as a measure for the hydrazine decomposition at an electrode, the current density I$_z$ is given which would be required to oxidize the same amount of hydrazine or the hydrogen formed in the decomposition of the hydrazine.

In the two electrodes mentioned above, the secondary reactions are reduced from an I$_z$ $_{ot\ current\ density\ of}$ 50 mA/cm$^2$ for the untreated electrode to a zero I$_z$ current density in the electrode treated according to the invention. The I$_z$ current density is calculated from the following equation: I$_z$ = $(k)$ $(1/Q)$ $(v/t)$, where $Q$ is the electrode area in cm$^2$, $v/t$ the amount of gas developed in cubic centimeters per second (cm$^3$/s); and $k$ is a constant having a value 5.3·10$^3$ . mA·s/cm$^3$.

Since the oxygen electrode is not affected, i.e., the activity of the oxygen electrode is fully retained, the efficiency of a hydrazine/oxygen fuel cell can be increased considerably through the use of an anode electrode treated according to the invention, as described in the following paragraphs.

A hydrazine/oxygen fuel cell has a theoretical no-load (zero current) voltage of about 1.6 V. When employing a Raney nickel electrode which has not been impregnated with a thiocyanate having a catalytically active coating of 20 mg/cm$^2$, and a supported Raney silver cathode (as referred to in Austrian Pat. No. 274,082) with a coating of 130 mg/cm$^2$, a 6 $n$ KOH/1 $m$ N$_2$H$_5$OH solution as the electrolyte, at 40°C and a load of 50 mA/cm$^2$, the voltage is about 1 V. This results in a voltage efficiency ($\eta_U$) of 0.62. As already mentioned, the current density I$_z$ of the secondary reactions occurring at the anode is 50 mA/cm$^2$. According to the equation $\eta_F = I/ (I + I_z)$, the Faraday efficiency $\eta_F$ calculated to be 0.5. The overall efficiency of the fuel cell ($\eta = \eta_U \cdot \eta_F$) is therefore 0.31.

Be replacing the above-mentioned anode with the corresponding thiocyanate-impregnated electrode prepared according to the invention, the cell voltage is decreased to 0.725 V (according to the increase of the polarization of the anode by 275 mV). The voltage efficiency is therefore only 0.45. Since the secondary reactions are, however, completely suppressed (I$_z$=0), the Faraday efficiency is 1.0 and the overall efficiency is consequently 0.45. This means that through the use of an anode prepared by the process herein described, the overall efficiency of a hydrazine/oxygen fuel cell can be increased from 31 to 45%, i.e., by about one-half.

The advantages of the invention may be achieved even if only small amounts of thiocyanate are employed. A Raney nickel electrode of large surface area (300 cm$^2$) and a coating of 15 mg/cm$^2$, i.e., a Raney nickel content of 4.5 g, exhibits results of similar quality with an addition of 0.3 g potassium thiocyanate (KSCN), i.e., a thiocyanate content of about 6.5% by weight, based upon the Raney nickel. The weight ratio of the Raney nickel to the thiocyanate is therefore 15:1, and the molar, or atomic, ratio about 25:1. Since about every fifth Raney nickel atom is at the surface, there is only one thiocyanate molecule (or radical) for every fifth surface atom of the Raney nickel layer. The effect of the thiocyanate therefore can not be caused by a masking of the Raney nickel.

The electrodes treated by the process according to the invention also exhibit their advantageous properties at higher electrolyte temperatures, e.g., at 70°C, when employed as anodes for the oxidation of hydrazine. Furthermore, such electrodes show excellent life-test characteristics: in life tests of more than 1000 hours, no appreciable decomposition of the hydrazine occurred at the electrodes.

Having thus described the invention, what is claimed is:

1. In a process of generating electricity in a fuel cell wherein the fuel comprises hydrazine, the improvement of employing a fuel electrode comprising Raney nickel and an alkali metal thiocyanate in the amount of between about 5 to 25 weight % based on said nickel.

2. The process of making an electrode adapted for use in a fuel cell, which process comprises impregnating Raney nickel with an alkali metal thiocyanate.

3. The process of claim 2, wherein said impregnating step comprises immersing a previously fabricated Raney nickel electrode in a dilute aqueous alkali metal thiocyanate solution.

4. The process of claim 3, wherein said aqueous solution also contains an alkali metal hydroxide.

5. The process of claim 3, wherein the concentration of said thiocyanate in said solution is about 0.0015 molar.

6. The process of claim 3, wherein said thiocyanate is potassium or sodium thiocyanate.

7. An electrode adapted for use in a fuel cell comprising Raney nickel impregnated with an alkali metal thiocyanate.

8. The electrode of claim 7, wherein said thiocyanate comprises from about 5 to about 25% by weight of said Raney nickel.

9. The electrode of claim 8, wherein said thiocyanate is potassium or sodium thiocyanate.

* * * * *

UNITED STATES PATENT AND TRADEMARK OFFICE
CERTIFICATE OF CORRECTION

PATENT NO. : 3 926 675
DATED : December 16, 1975
INVENTOR(S) : HANS KOHLMÜLLER ET AL It is certified that error appears in the above-identified patent and that said Letters Patent are hereby corrected as shown below:

In column 3, line 60, change "above-state" to

--above-stated--

In column 4, line 4, delete "01" after "$I_z$" to read

-- $I_z$ current density--

Signed and Sealed this thirtieth Day of March 1976

[SEAL]

Attest:

RUTH C. MASON
Attesting Officer

C. MARSHALL DANN
Commissioner of Patents and Trademarks